(12) United States Patent
Siddiqui

(10) Patent No.: US 7,535,464 B1
(45) Date of Patent: May 19, 2009

(54) NAVIGATION WHEEL HAVING DISCRETE SWITCHES

(75) Inventor: Kabir Siddiqui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 10/929,162

(22) Filed: Aug. 30, 2004

(51) Int. Cl.
 G09G 5/00 (2006.01)
 G06F 3/033 (2006.01)
(52) U.S. Cl. .................................... 345/184; 345/156
(58) Field of Classification Search ................ 345/184, 345/156; 200/14, 18
 See application file for complete search history.

(56) References Cited

U.S. PATENT DOCUMENTS

| | | | |
|---|---|---|---|
| 5,473,344 A | 12/1995 | Bacon et al. | 145/163 |
| 5,557,440 A | 9/1996 | Hanson et al. | 359/161 |
| 5,825,353 A * | 10/1998 | Will | 345/184 |
| 5,912,661 A | 6/1999 | Siddiqui | 345/166 |
| 5,963,197 A | 10/1999 | Bacon et al. | 345/163 |
| 6,031,518 A | 2/2000 | Adams et al. | 245/156 |
| 6,097,371 A | 8/2000 | Siddiqui et al. | 345/164 |
| 6,144,372 A | 11/2000 | Chen | 345/184 |
| 6,211,474 B1 * | 4/2001 | Takahashi | 200/18 |
| 6,281,881 B1 | 8/2001 | Siddiqui et al. | 345/164 |
| 6,353,429 B1 | 3/2002 | Long | 345/158 |
| 6,380,927 B1 | 4/2002 | Ostrum et al. | 345/165 |
| 6,388,212 B1 * | 5/2002 | Ishihara et al. | 200/18 |
| 6,394,906 B1 * | 5/2002 | Ogata | 463/38 |
| 6,429,852 B1 | 8/2002 | Adams et al. | 345/163 |
| 6,556,150 B1 | 4/2003 | McLoone et al. | 341/120 |
| 6,967,293 B1 * | 11/2005 | Chen et al. | 200/14 |
| 2003/0025673 A1 | 2/2003 | Ledbetter et al. | 345/163 |
| 2003/0214482 A1 | 11/2003 | Chen | 345/163 |
| 2006/0007129 A1 | 1/2006 | Pletikosa | 345/156 |

OTHER PUBLICATIONS

1991, Deb Roy, Nitin Sawhney, Chris Schmandt and Alex Pentland; "*Wearable Audio Computing: A Survey of Interaction Techniques*"; 9 pgs.; Perceptual Computing Group and Speech Interface Group MIT Media Laboratory, 20 Ames St., Cambridge, MA 02139.
1990, Robert J. K. Jacob, Linda E. Sibert, Daniel, C. McFarlane and M. Preston Mullen, Jr.; "*Integrality and Separability of Input Devices*"; 40 pgs.; Human-Computer Interaction Lab Naval Research Laboratory Washington D.C.
1995, Richard Pekelney and Robin Chu; "*Design Criteria of an Ergonomic Mouse Computer Input Device*"; Proceedings of the Human Factors and Ergonomics Society 39th Annual Meeting—1995; pp. 369-373.
2000, Donald A. Dennis; "*Become an Industrial Athlete: Ergonomic Don's Guide to Preventing Office Injuries*"; May/Jun. 2000, Law Practice Management; pp. 47-48.
1999, T. Zeh; "*The Technology of Ergonomic Touch Entry Devices*"; IEE 1999; pp. 343-345.

* cited by examiner

*Primary Examiner*—Kevin M Nguyen
(74) *Attorney, Agent, or Firm*—Merchant & Gould, P.C.

(57) ABSTRACT

An ergonomic pointing device receives user commands for controlling an electronic device. Typically three switches are provided underneath a navigation wheel. The two side switches are typically located towards the back right and left corners of the navigation wheel body, whereas the select/enter dome switch is typically located in an area that is at or substantially near the front midsection of the wheel body. A pivot pin is typically provided in a back center area of the navigation wheel body. The navigation wheel is arranged to slightly rock in response to a user's downwards force. The left and right switches operate when the wheel rocks left and right about the pivot pin. The select/enter switch operates when the wheel rocks frontward and backwards about the pivot pin. An optional plastic cap can be used to secure the navigation wheel assembly to a base such as a printed circuit board.

16 Claims, 5 Drawing Sheets

NAVIGATION WHEEL HAVING DISCRETE SWITCHES

BACKGROUND OF THE INVENTION

Small, mobile devices such as hand-held and pocket-sized computers, tablet computers, cellular telephones and the like, are becoming important and popular tools. In general, they have become small enough to be extremely convenient, while consuming less battery power, and at the same time have become capable of running more powerful applications.

Pointing and/or selection devices for entering commands into such mobile devices are currently available in a variety of configurations. Mechanical encoder wheels are often used in various mobile devices as part of the user interface. Many such mechanical encoder wheels include a rotatable wheel or roller mounted on the device. As the wheel is moved, transducers sense the movement of the wheel and generate signals that indicate the direction and amount of the movement. The signals are used, for example, to control movement of a cursor on the screen of the mobile device. The signals may also be used, for example, for scrolling a window that is displayed on the screen in a way that is similar to using the scroll bar of a window to scroll the window.

The shrinking size of mobile devices often entails using smaller pointing devices. However, the smaller features of the smaller input devices commonly result in increased manufacturing difficulties and reliability problems (including increased wear). Manufacturing difficulties typically result in increased cost of manufacturing the mobile devices that comprise the smaller pointing devices. Reliability problems may result in intermittent functionality of the wheel such that, for example, the scrollable window may appear to jump or the wheel may appear to move discontinuously. In more extreme cases, the wheel could fail entirely, which can render the mobile device unusable and require expensive replacement or repair.

SUMMARY OF THE INVENTION

Briefly stated, the present invention is directed towards an ergonomic pointing device for receiving commands from a user for controlling an electronic device. Typically three switches are provided underneath a navigation wheel. The two side switches are typically located towards the back right and left corners of the navigation wheel body, whereas the select/enter dome switch is typically located in an area that is at or substantially near the front midsection of the wheel body. A pivot pin is typically provided in a back center area of the navigation wheel body. The navigation wheel is arranged to slightly rock in response to a user's downwards force. The left and right switches operate when the wheel rocks left and right about the pivot pin. The select/enter switch operates when the wheel rocks frontward and backwards about the pivot pin. An optional plastic cap can be used to secure the navigation wheel assembly to a base such as a printed circuit board.

According to one aspect of the invention, a pointing device for controlling an electronic device comprises a wheel that is arranged to modulate a signal such that rotation of the wheel about a longitudinal access can be determined; a first, second, and third switch, each of which are generally configured to modulate a signal in response to a user depressing the wheel; and a pivot pin that is arranged at a first point to inhibit both the first and the second switches from modulating a signal in response to a single depression of the wheel.

According to another aspect of the invention, invention, a pointing device comprises a wheel means for modulating a signal such that rotation of the wheel means about a longitudinal access can be determined; a first, second, and third switch means, each of which are generally configured to modulate a signal in response to a user depressing the wheel means; and a pivot means that is arranged at a first point to inhibit both the first and the second switch means from modulating a signal in response to a single depression of the wheel.

According to one aspect of the invention, an electronic device comprises a wheel that is arranged to modulate a signal such that rotation of the wheel about a longitudinal access can be determined; a first, second, and third switch, each of which are generally configured to produce a signal in response to a user depressing the wheel; a pivot pin that is arranged at a first point to inhibit both the first and the second switches from producing a signal in response to a single depression of the wheel; and a processor that is arranged to receive the produced signals An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE INVENTION

Figure 1:
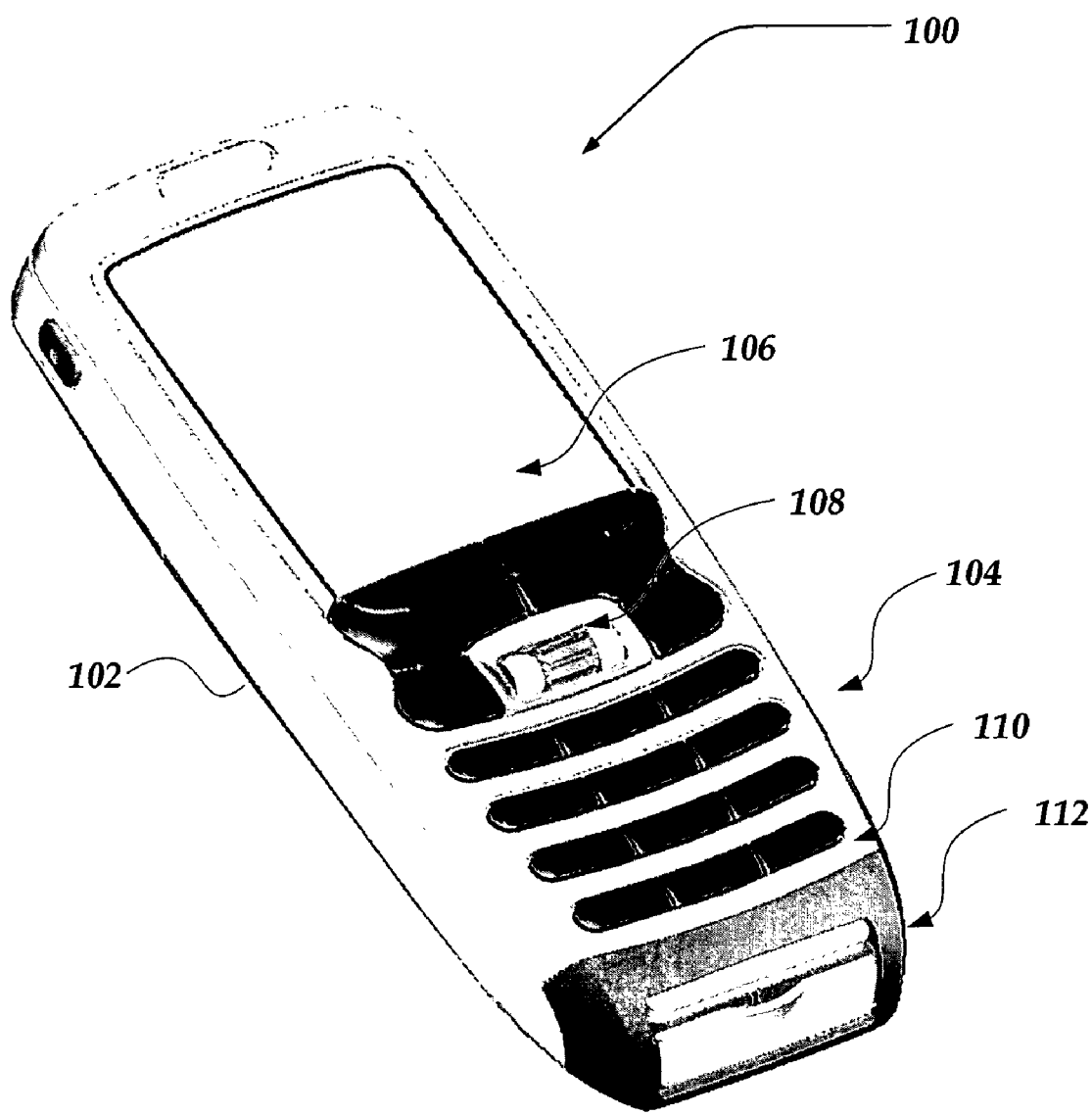
FIG. 1 illustrates an exemplary mobile device in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

Briefly stated, the present invention is directed towards an ergonomic pointing device for receiving commands from a user for controlling an electronic device. Typically three switches are provided underneath a navigation wheel. The two side switches are typically located towards the back right and left corners of the navigation wheel body, whereas the select/enter dome switch is typically located in an area that is at or substantially near the front midsection of the wheel body. A pivot pin is typically provided in a back center area of the navigation wheel body. The navigation wheel is arranged to slightly rock in response to a user's downwards force. The left and right switches operate when the wheel rocks left and right about the pivot pin. The select/enter switch operates when the wheel rocks frontward and backwards about the pivot pin. An optional plastic cap can be used to secure the navigation wheel assembly to a base such as a printed circuit board.

FIG. 1 illustrates an exemplary mobile device in accordance with the present invention. Mobile device 100 may include many more or less components than those shown. The components shown, however, are sufficient to disclose an illustrative embodiment for practicing the invention. Mobile device 100 includes case 102. Case 102 typically is arranged to support and protect user interface instrumentalities such as keypad 104 and display 106. Keypad 104 is often programmable and can be used for functions such as text input, game functions, phone dialing, and the like. Display 106 may optionally contain a touch screen interface, which can also be used for input of text. Display 106 may be used to display maps, text, games, pictures, and the like. Wheel 108 may be used in conjunction with Display 106 to enable manipulation and selection of displayed information by a user. Fascia 110 typically overlies keypad 104 and display 106 and can be used to display legends for buttons, brand names, and the like. Boot 112 can be extended outwards from case 102, which can be used to release keypad 104 and fascia 110 for replacement. Keypad 104 and fascia 110 can be customized for different applications such as game playing, text entry, phone dialing, and the like.

Generally, mobile device 100 may include virtually any portable computing device capable of receiving and transmitting signals between another mobile device, and providing audio signals, such as ringer tones, and the like. Such devices include cellular telephones, smart phones, audio pagers, radio frequency (RF) devices, infrared (IR) devices, integrated devices combining one or more of the preceding devices, and the like. Mobile device 100 may also include other devices, such as Personal Digital Assistants (PDA) with audio functions, handheld computers, wearable computers, and the like. As such, mobile device 100 typically ranges widely in terms of capabilities and features.

Figure 2:
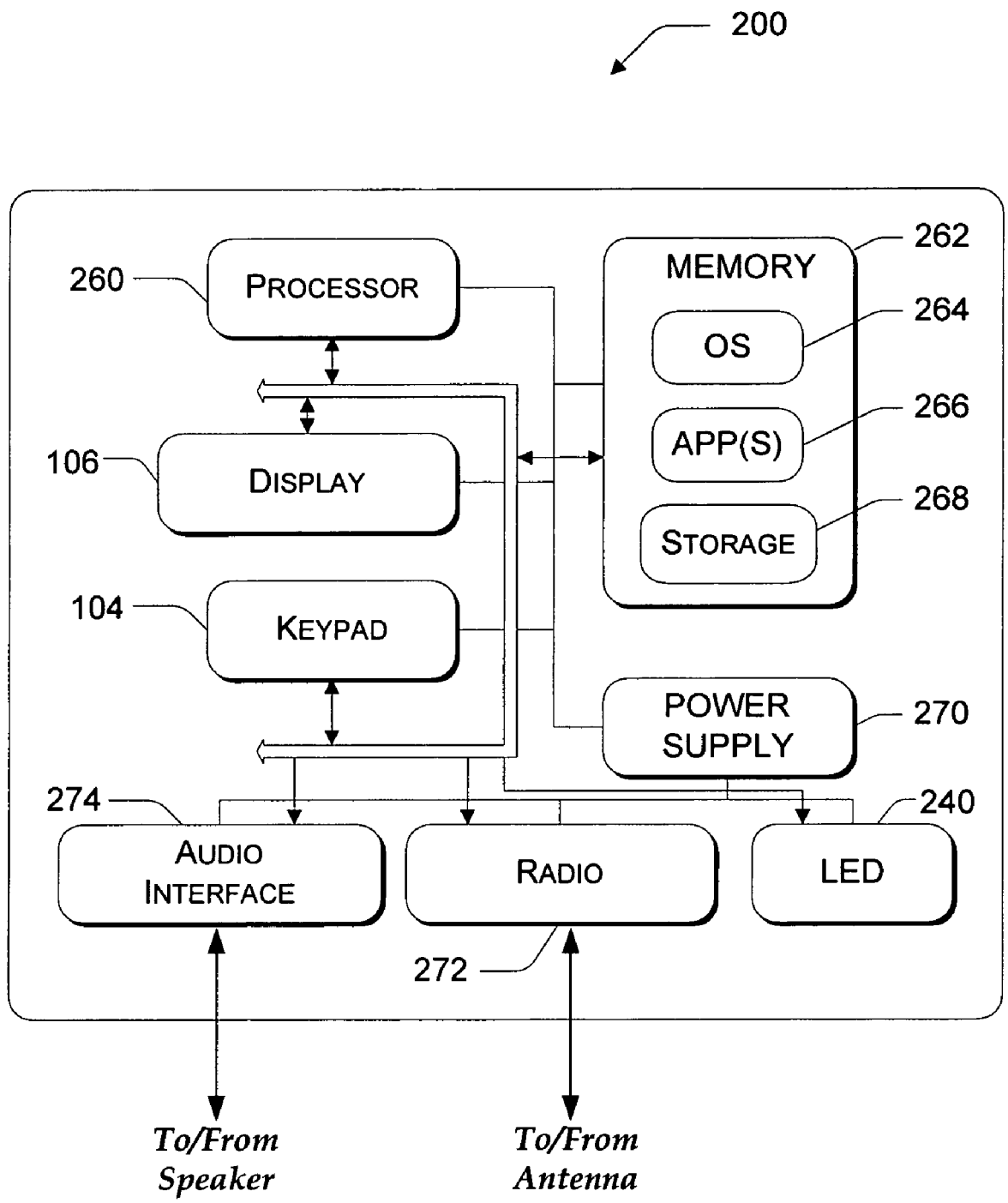
FIG. 2 is a functional block diagram illustrating an embodiment of functional components of an example mobile device in accordance with the present invention.

FIG. 2 is a functional block diagram illustrating an embodiment of functional components of an example mobile device in accordance with the present invention. Components 200 may include many more or less components than those shown. The components shown, however, are sufficient to disclose an illustrative embodiment for practicing the invention.

As shown in the figure, components 200 include processor 260, memory 262, display 106, and keypad 104. Memory 262 generally includes both volatile memory (e.g., RAM) and non-volatile memory (e.g., ROM, Flash Memory, or the like). Components 200 may include an operating system 264, such as the Windows CE operating system from Microsoft Corporation or other such operating system, which is resident in memory 262 and executes on processor 260. Keypad 104 may be a push button numeric dialing pad (such as on a typical telephone), a game pad, or the like. Display 106 may be a liquid crystal display, or any other type of display commonly used in a mobile communications device. For example, display 106 may be touch-sensitive, and would then also act as an input device.

One or more application programs 266 may be loaded into memory 262 and run on operating system 264. Examples of application programs include phone dialer programs, email programs, user ringer tone selection programs, and so forth. The application programs may operate in conjunction with wheel 108 to, for example, allow a user to select a particular data field displayed in a list. Components 200 also include non-volatile storage 268 within memory 262. Non-volatile storage 268 may be used to store persistent information which should not be lost if the mobile device 100 is powered down. The application programs 266 may use and store information in storage 268, such as e-mail, user selectable ringer tones, and the like.

Components 200 also include power supply 270, which may be implemented as one or more batteries. Power supply 270 might further include an external power source, such as an AC adapter or a powered docking cradle that supplements or recharges the batteries.

Components 200 are also shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output. The audible output may be provided in response to an input command such as a button press or manipulation of wheel 108. Audio interface 274 may also be coupled to a microphone, receiving speaker, or the like, for receiving audible input, such as to facilitate a telephone conversation.

Components 200 also include radio 272 that performs the function of transmitting and receiving radio frequency communications. Radio 272 may be coupled to an antenna. Radio 272 facilitates wireless connectivity between components 200 and the outside world, via a communications carrier or service provider. Transmissions to and from radio 272 are conducted under the control of operating system 264 such that communications received by radio 272 may be disseminated to application programs 266 via operating system 264, and vice versa.

Radio 272 allows components 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 3:
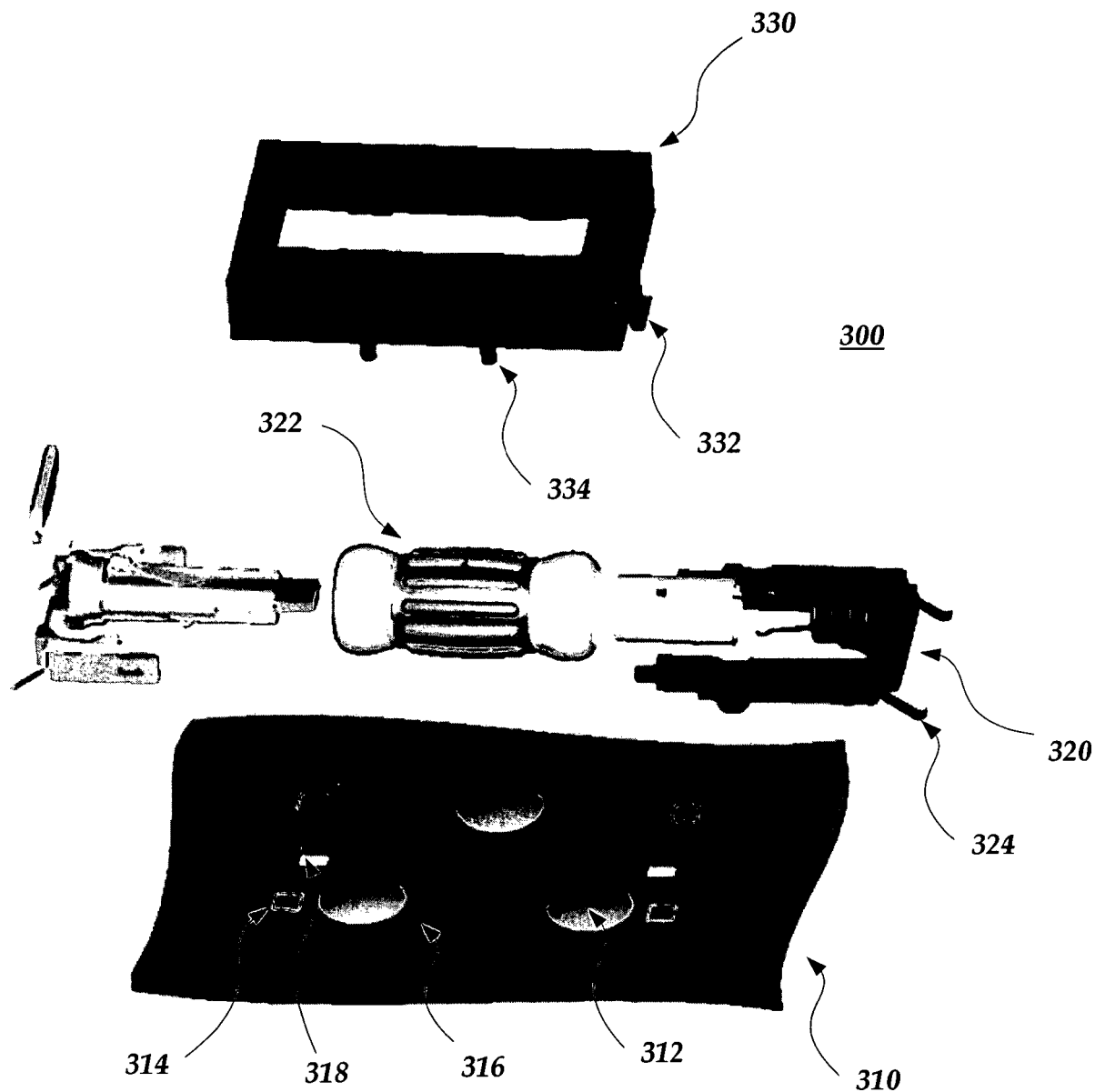
FIG. 3 is an exploded-view diagram generally illustrating components of a wheel assembly in accordance with the present invention.

FIG. 3 is an exploded-view diagram generally illustrating components of a wheel assembly in accordance with the present invention. Illustrated in assembly 300 are base 310, wheel assembly 320, and optional cap 330. In general, wheel assembly 320 is used to form signals for, for example, scrolling movements when the user rotates wheel 322. Additionally, the user can close (or open) switches (such as may be formed by dome switches 312) by depressing wheel assembly in a substantially downwards direction (which is discussed more fully with respect to FIG. 4). Thus, the user can, for example, depress the wheel assembly to close dome switches for selection of an item in a list shown in display 106.

Base 310 provides a surface to which wheel assembly 320 can be affixed. Wheel assembly 320 can be affixed, for example, by soldering contact/lead 324 to base 310 at pad 314. Alternatively (or conjunctively), wheel assembly 320 can be affixed, for example, by using cap 330 to captivate wheel assembly 320 to base 310. Retaining clip 332 can be arranged to extend through aperture 318 and secure to a posterior surface of base 310. Each guide pin 334 can be arranged to fit within a corresponding aperture 316 to help prevent lateral movement of and to align wheel assembly 320.

Figure 4A:
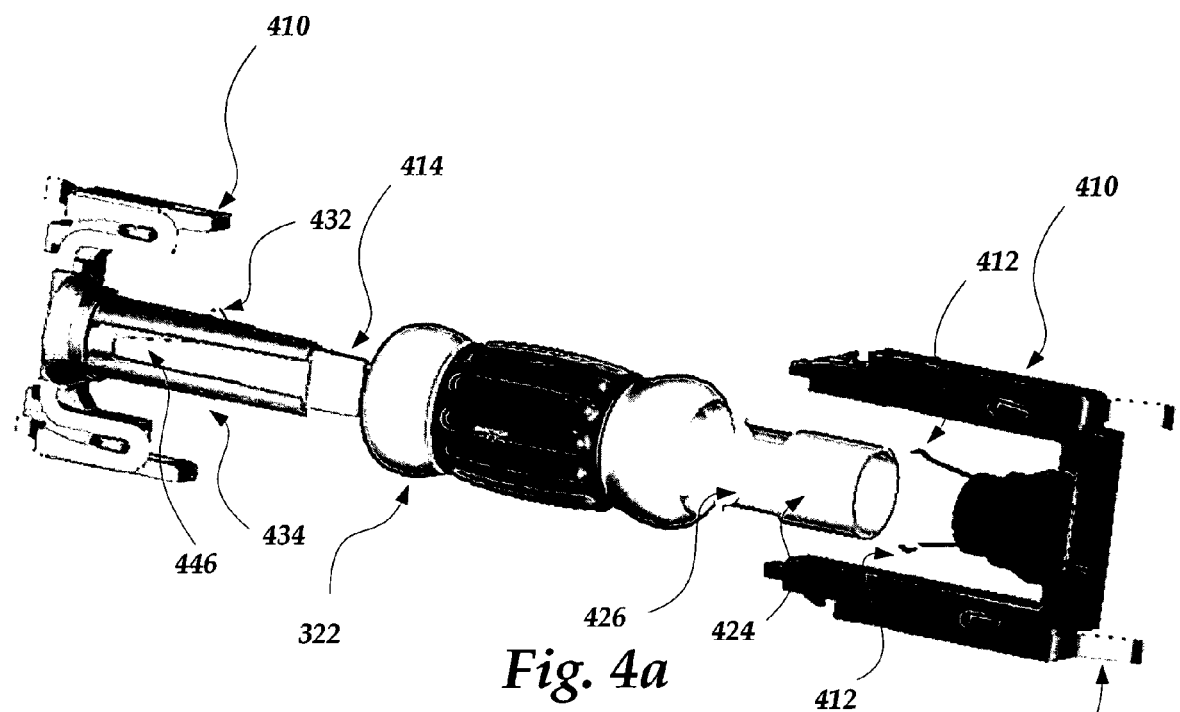
FIG. 4a is a view diagram generally illustrating components of a partially assembled wheel assembly in accordance with the present invention.

FIG. 4a is a view diagram generally illustrating components of a partially assembled wheel assembly in accordance with the present invention. Frame 410 (shown here in two halves) is arranged to secure wheel 322, which is substantially free to rotate in a forwards and backwards direction about the longitudinal axis of shaft 414.

Frame 410 is arranged to captivate shaft 414 (about which wheel 322 is disposed) such that shaft 414 is free to move for a short distance in a direction (e.g., up or down along the Z-axis) that is substantially perpendicular to the axis of rotation of roller 330. Shaft 414 is also typically captivated in a manner that prevents shaft 414 from rotating in conjunction with wheel 322. Frame 410 may also comprise electrical leads 324 for providing electrical connections to direction-sensing spring contacts 432 and 434 and common spring contacts 412.

Direction-sensing spring contacts 432 and 434 and common spring contacts 412 are illustrated as being affixed to shaft 414. Direction-sensing spring contacts 432 and 434 are arranged within shaft 414 such that the contacts alternately make and break electrical contact during a revolution of wheel 322. Direction-sensing spring contacts 432 and 434 are typically aligned lengthwise along the axis of rotation.

Direction-sensing spring contacts 432 and 434 and common spring contacts 412 are illustrated as being affixed to shaft 414. Common spring contacts 412 are arranged within shaft 414 such that contact 324 typically remains electrically coupled to contact sleeve 424 throughout an entire revolution of wheel 322. Direction-sensing spring contacts 432 and 434 and common spring contacts 412 are arranged as switches for indicating the rotational speed and direction of rotation of wheel 322. In other embodiments, common spring contact2 412 may also be arranged to make and break contact in response to the rotation of wheel 322 as long as the rotational speed and direction of rotation of wheel 322 can be determined.

In one embodiment, wheel 322 encapsulates an electrically conductive contact sleeve 424. Contact sleeve 424 is typically rigidly affixed within wheel 322 so that contact sleeve 424 and wheel 322 rotate (and move in a direction that is substantially perpendicular to the axis of rotation) as a unit.

Contact sleeve 424 comprises one or more regions of nonconductivity. Regions of nonconductivity (such as shown in left portion 426) are typically embodied as apertures within contact sleeve 424, although coatings or depressions within sleeve 332 may also be employed. The regions and contacts 432 and 434 are arranged to provide switching such that an electrical circuit can determine the direction and speed of rotation of wheel 322. The regions and/or contacts 432 and 434 are typically circumferentially arranged about the axis of rotation at an angle of other than 180 degrees to enable the detection by the electrical circuit of the direction of rotation of wheel 322.

In other embodiments, wheel 322 may be formed as an integral unit that has one or more regions of nonconductivity that are arranged to open and close at least one electrical circuit during the rotation of wheel 322. In various embodiments, roller 330 may comprise external knurls, which typically help a user to more easily manipulate the roller.

Figure 4B:
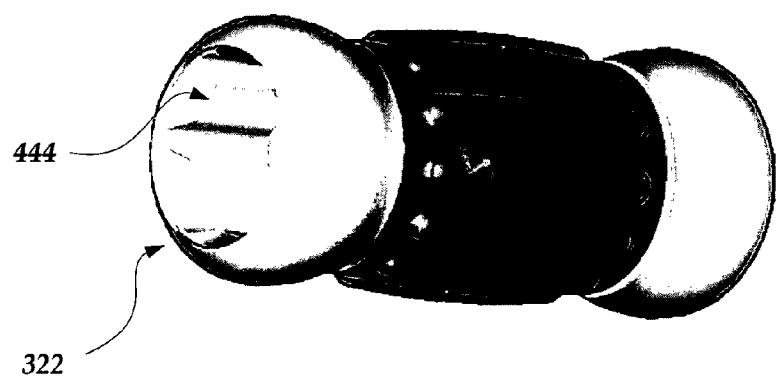
FIG. 4b is a view diagram generally illustrating a wheel that is in arranged accordance with the present invention.

FIG. 4b is a view diagram generally illustrating a wheel that is in arranged accordance with the present invention. Internal depressions 444 serve to temporarily captivate detent spring 446 (shown in FIG. 4a).

Figure 5A:
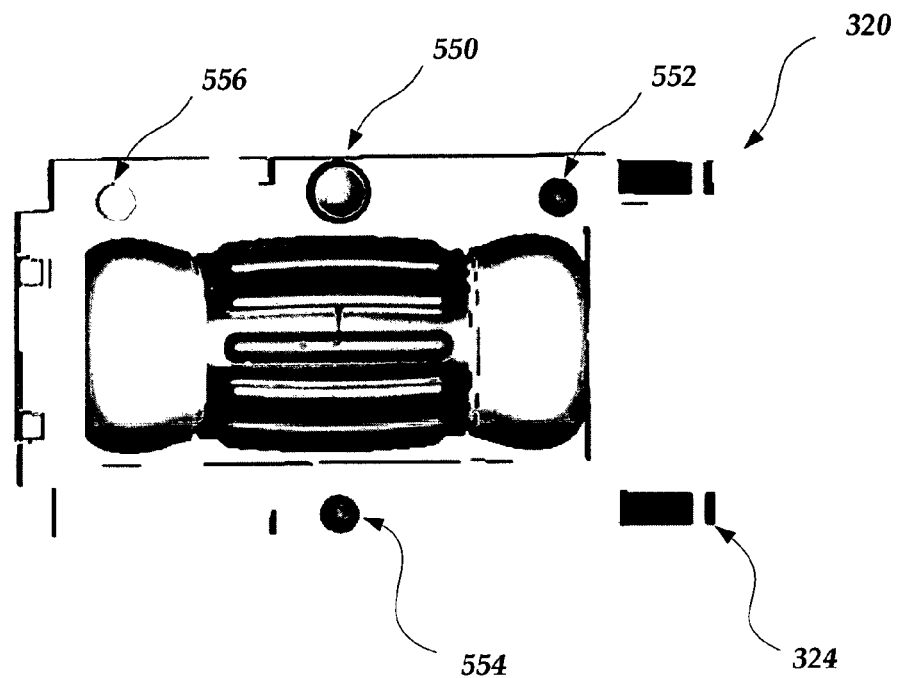
FIG. 5a is a view diagram generally illustrating the underside of a wheel assembly in accordance with the present invention.

FIG. 5a is a view diagram generally illustrating the underside of a wheel assembly in accordance with the present invention. Wheel assembly 320 further comprises pivot pin 550 and plungers 552, 554, and 556. Pivot pin 550 is typically extends further downwards than plungers 552, 554, and 556 such that when a downwards force is applied to the switch, wheel assembly 320 will rock/pivot about pivot pin 550 such that one of the plungers can actuate a switch (such as dome switch 312).

In a accordance with the generally "T"-shaped arrangement of the pin and plungers, a force applied to a left side of wheel 322 will typically cause plunger 552 to actuate a first switch, a force applied to a right side of wheel 322 will typically cause plunger 556 to actuate a second switch, and a force applied to the center of the wheel will typically cause plunger 554 to actuate a third switch.

Thus, a user can (intuitively) select any of a left switch, a center switch, and a right switch merely by exerting a substantially downwards force to the left, center, or right portions of wheel 322. The left, center, and right switches can correspond to likewise-arranged items on display 106, or, for example, "back," "select," and "forward" functions.

Pivot pin 550 thus allows a third switch to be selected (in addition to the forwards and backwards rotation of wheel 322) without having to rely upon simultaneous selection of two switches. Relying upon simultaneous depression of two switches (for a third function) can cause problems in timing and repeatability for the software in trying to determine the intent of the user depressing the wheel.

Additionally, simultaneous switch selection can be accomplished in accordance with the present invention by closing the left and center or center and right switches while using a left-center or a center-right downwards force, respectively. However, the simultaneous activation of two switches usually doubles the required operating force, and the sound and feel of two switches activated at the same time is different than activating one switch at a time, which might not be desirable.

Figure 5B:
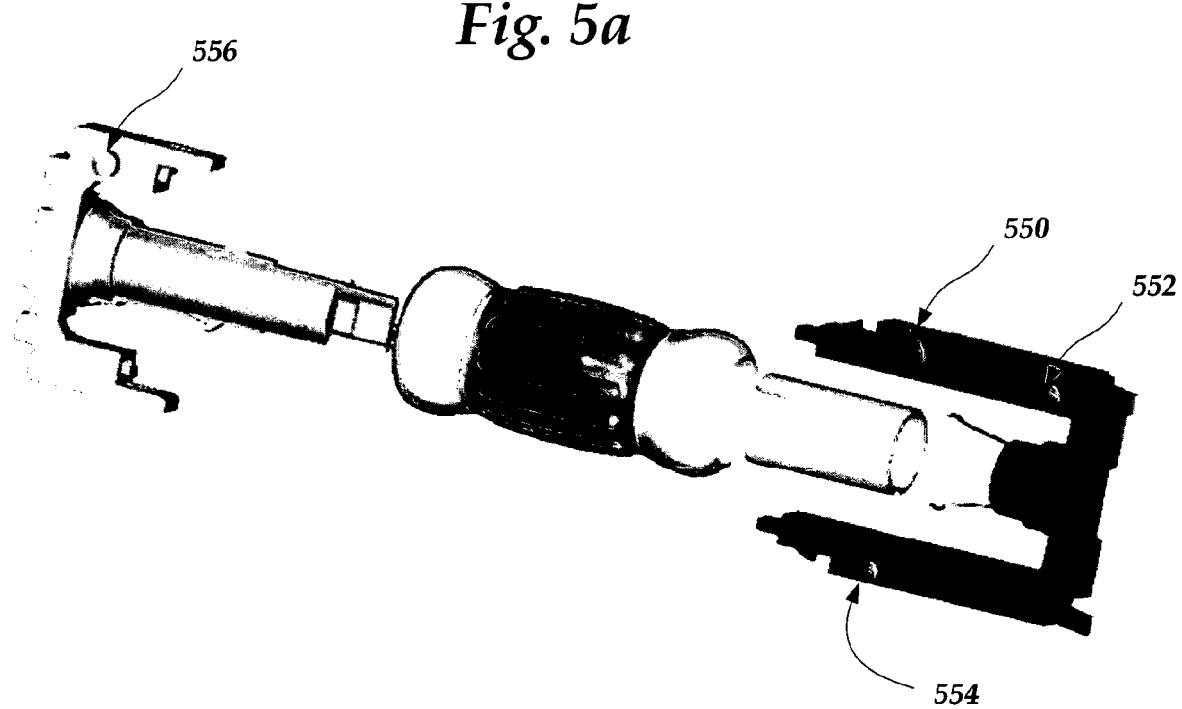
FIG. 5b is a view diagram illustrating an orthogonal projection of an exploded-view of the underside of a wheel assembly in accordance with the present invention.

FIG. 5b is a view diagram illustrating an orthogonal projection of an exploded-view of the underside of a wheel assembly in accordance with the present invention. Wheel assembly 320 is shown with the relative sizes and positioning of pivot pin 550 and plungers 552, 554, and 556.

Springs (not shown) may be used to return the depressed wheel to its original position. The springs may be located within switches 312, mounted on base 310, within wheel assembly 320, or in any other suitable location. The springs may also be used as electrical contacts (e.g., as in electrical lead 324) to electrically couple with, for example, at least one direction-sensing contact 432.

Other embodiments of the invention are possible without departing from the spirit and scope of the invention. For example, the wheel may be mounted in a "mouse" and electrically coupled to a processor via an external cable. Additionally, the positions of the pivot pin and plungers can be in differing positions than what is illustrated in the accompanying figures, while still allowing left, center, and right downwards forces to select one (or more) of three switches. The above specification, examples, and data provide a complete description of the manufacture and use of the composition of the invention. Since many embodiments of the invention can be made without departing from the spirit and scope of the invention, the invention resides in the claims hereinafter appended.

I claim:

1. A pointing device for controlling an electronic device, comprising:
    a wheel that is arranged to modulate a signal such rotation of the wheel about a longitudinal axis is determinable;
    a first switch disposed adjacent a first end of the wheel such that depressing the first end of the wheel results in the first switch modulating a signal;
    a second switch disposed adjacent a second end of the wheel such that depressing the second end of the wheel results in the second switch modulating a signal;
    a third switch disposed adjacent to the wheel between the first and second ends of the wheel and wherein the third switch is offset from the first and second switch; and
    a pivot pin that is arranged adjacent and offset to the wheel at a first point between the first and second ends of the wheel to:
        inhibit both the first and the second switches from modulating a signal in response to a single depression of the wheel;
        allow both the first and third switches to modulate a signal in response to a single depression of the wheel at a point between the pivot pin and the first end of the wheel; and
        allow both the second and third switches to modulate a signal in response to a single depression of the wheel at a point between the pivot pin and the second end of the wheel.

2. The pointing device of claim 1, further comprising a base.

3. The pointing device of claim 2, wherein the base comprises an electrical circuit.

4. The pointing device of claim 3, wherein the electrical circuit is arranged to determine the rotational direction of the wheel.

5. The pointing device of claim 1, further comprising a cap that is arranged to affix the wheel to the base.

6. A pointing device, comprising:
    a wheel for modulating a signal such that rotation of the wheel about a longitudinal axis is determinable wherein the wheel includes a first end and a second end opposite the first end;
    a first, second, and third switch, each of which are generally configured to modulate a signal in response to a user depressing the wheel; wherein at least one of the switches is arranged offset from a center location of the other two switches; and
    a pivot that is arranged at a first point between the first end of the wheel and the second end of the wheel and offset from the first end of the wheel and the second end of the wheel to:
        inhibit both the first and the second switch from modulating a signal in response to a single depression of the wheel;
        allow both the first and third switches to modulate a signal in response to a single depression of the wheel at a point between the pivot pin and the first end of the wheel; and
        allow both the second and third switches to modulate a signal in response to a single depression of the wheel at a point between the pivot pin and the second end of the wheel.

7. The pointing device of claim 6, wherein the first, second, and third switches lie subjacent to the wheel.

8. The pointing device of claim 6, further comprising a base.

9. The pointing device of claim 8, wherein the base comprises an electrical circuit.

10. The pointing device of claim 9, wherein the electrical circuit is arranged to determine the rotational direction of the wheel.

11. The pointing device of claim 6, further comprising a cap arranged to affix the wheel to the base.

12. The pointing device of claim 6, wherein the first switch is arranged to modulate a signal in response to a left depression of the wheel, the second switch is arranged to modulate a signal in response to a right depression of the wheel, and the third switch is arranged to modulate a signal in response to a center depression of the wheel.

13. An electronic device, comprising:
    a wheel that is arranged to modulate a signal such that rotation of the wheel about a longitudinal axis is determinable;
    a first, second, and third switch, each of which are generally configured to produce a signal in response to a user depressing the wheel, wherein the first switch and the second switch are disposed at opposing ends of the longitudinal axis of the wheel; and wherein the third switch is arranged offset from a center location of the first switch and the second switch;
    a pivot pin that is arranged at a first point generally adjacent and offset from a midpoint of the longitudinal axis of the wheel to:
        inhibit both the first and the second switches from producing a signal in response to a single depression of the wheel;
        allow both the first and third switches to modulate a signal in response to a single depression of the wheel at a point between the pivot pin and the first end of the wheel; and
        allow both the second and third switches to modulate a signal in response to a single depression of the wheel at a point between the pivot pin and the second end of the wheel; and
    a processor that is arranged to receive the produced signals.

14. The device of claim 13, wherein the processor is further arranged to change an electronic image in response to the produced signals.

15. The device of claim 14, further comprising a display that is arranged to display the electronic image.

16. The device of claim 13, further comprising an application program that is configured to select a particular data field displayed in a list in response to the produced signals.

* * * * *